United States Patent [19]

Engelsmann

[11] 4,097,882
[45] Jun. 27, 1978

[54] MULTIPLE LENS CAMERA HAVING LENS-POSITION CONTROLLED FOCAL-LENGTH ADJUSTMENT

[75] Inventor: Dieter Engelsmann, Unterhaching, Germany

[73] Assignee: AGFA-Gevaert AG, Leverkusen, Germany

[21] Appl. No.: 752,314

[22] Filed: Dec. 20, 1976

[30] Foreign Application Priority Data

Dec. 23, 1975 Germany ........................... 2558277

[51] Int. Cl.² ..................... G03B 3/00; G03B 13/02
[52] U.S. Cl. .................................................. 354/197
[58] Field of Search ................ 354/195, 197, 198; 352/142; 355/55; 350/183, 254, 39

[56] References Cited

U.S. PATENT DOCUMENTS

| | | | |
|---|---|---|---|
| 2,832,274 | 4/1958 | Lorenz | 354/197 X |
| 3,882,520 | 5/1975 | Kamp et al. | 354/197 |
| 4,038,671 | 7/1977 | Schroder et al. | 354/197 |

*Primary Examiner*—John Gonzales
*Attorney, Agent, or Firm*—Michael J. Striker

[57] ABSTRACT

A carrier mounting two or more different lenses of a camera can be selectively moved transverse to the optical axis of the camera so as to place any one of the lenses in operating position. The carrier can also be adjusted lengthwise of the optical axis to vary the focal length of the lenses. An arrangement is provided for selecting a desired focal length, and a follow-up system adjusts the distance through which the carrier is moved lengthwise in dependence upon which of the lenses is in operating position.

6 Claims, 3 Drawing Figures

MULTIPLE LENS CAMERA HAVING LENS-POSITION CONTROLLED FOCAL-LENGTH ADJUSTMENT

BACKGROUND OF THE INVENTION

The present invention relates to photographic cameras. In particular, it relates to a photographic camera having at least two different lenses which can selectively be placed in operating position.

When it is desired to change a camera from normal picture taking to telephotography, and vice versa, the focal length of its objective — i.e., its lens — must be changed. In motion-picture cameras this is now usually accomplished by using a variable-focus objective, a so-called "zoom lens", although it is also known to provide a carrier on which two or more lenses of different focus are mounted and which can be appropriately shifted or rotated in order to place the respectively desired lens in operating position. Such arrangements are also known for still cameras.

Predictably, it has now been proposed to equip small still cameras using "type 110" film cassettes, popularly known as "pocket cameras", with a telephotography capability. The dimension of these cameras can be small and their shape flat, due to the size and shape of the film cassettes they use. Since it is desired to avoid exceeding the dimensions of the housing, it has been proposed to mount two different lenses on a slidable carrier and to integrate the resulting assembly within the camera housing.

This basic concept is attractice; however, difficulties are experienced when it is attempted to translate the concept into technical reality. If the camera is of the type which permits the user to set the distance to the subject being photographed, which is done by moving the lenses lengthwise of the optical axis of the camera, then the two lenses — due to their different focal lengths — must be moved lengthwise of the optical axis by different distances even though in both instances the distance to the subject being photographed is the same. In other words: if the lens for normal photography is set to focus, e.g., on a subject 10 feet from the camera, this setting is incorrect for the telephoto lens because of the different focal length of the same. This relationship is always true, except if the distance is set for infinity. The result is that for all settings except infinity the distance setting must be changed whenever the user switches from one to the other lens. This is at least bothersome for the user, and can often lead to ruined exposures when the user changes from one lens to the other but forgets to reset the distance.

SUMMARY OF THE INVENTION

Accordingly, it is an object of the present invention to overcome the aforementioned problems.

More particularly, it is an object of the invention to provide a camera having two or more selectively usable lenses and avoiding these problems. Such a camera may be of the type using "110" film cassettes, but the invention is not restricted to this type of camera.

A still more specific object is to provide such a camera as outlined above, which is provided with a simple distance-setting instrumentality and in which the distance set for the purpose of focusing one of the lenses is automatically correct also for the other lens or lenses.

Briefly stated the invention is embodied in a photographic camera having an optical axis and comprising at least two different photographic lenses; a lens carrier mounting the lenses; means mounting the lens carrier for displacement in a direction normal to the axis between respective lens-changing first settings in each of which a different one of the lenses is located on the optical axis, and also for displacement in a direction lengthwise of the axis to different second settings corresponding to different focal lengths; means for selecting respective ones of the second settings; and means responsive to operation of the selecting means for displacing the lens carrier lengthwise of the optical axis through distances which differ for each of the second settings in dependence upon the respective first setting assumed by the lens carrier.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

DESCRIPTION OF A PREFERRED EMBODIMENT

Figure 1:
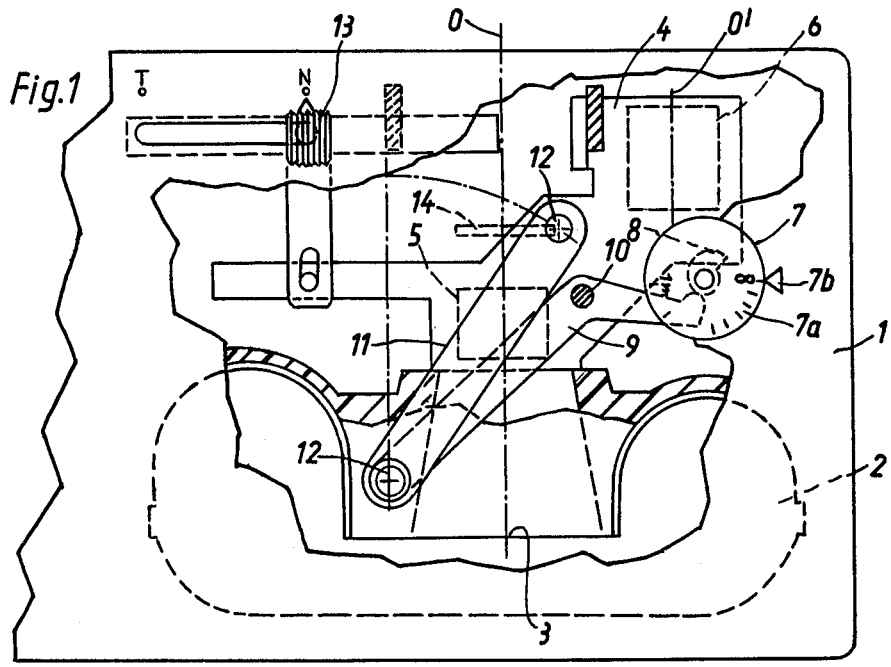
FIG. 1 is a somewhat diagrammatic partial top-plan view, showing a camera embodying the invention with the normal lens in operating position and focused for infinity.

The drawing illustrates only those parts of a camera using type "110" film cassettes, which are essential to an understanding of the invention. It also shows the camera as having two different lenses, but it should be understood that the invention is equally applicable to cameras having more than two different lenses.

With the above in mind, it will be seen that in all Figures of the drawing the camera has a housing 1 for a type "110" film cassette 2. The latter has a film window 3 and accommodates a supply of film which is incrementally moved into registry with the film window 3 so that the film portion thus located opposite the window 3 can be exposed through whichever one of the lenses 5 and 6 is in the operating position. The mechanism for transporting the film in cassette 2 is not illustrated; it forms no part of the invention and is known per se.

Figure 2:
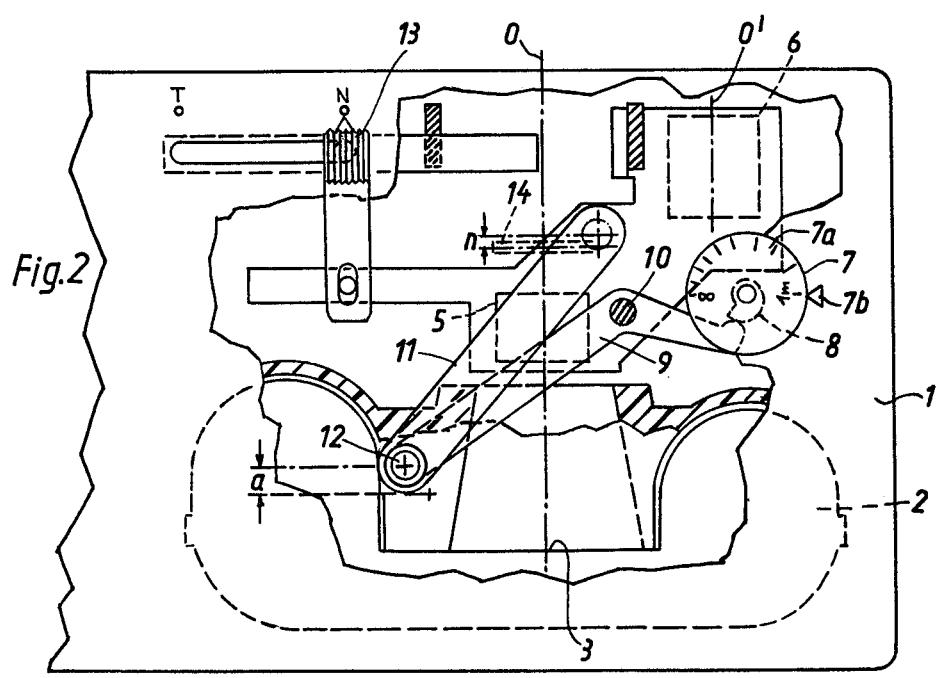
FIG. 2 is the same view as FIG. 1, but showing the normal lens focused for a close-up picture.

The lens 6 is a telephoto lens whereas lens 5 is a normal lens, to be employed when it is not desired to make telephoto shots. To be selectively movable to operating position in which they are located on the optical axis of the camera, i.e., opposite the film window 3, the lenses 5 and 6 are mounted on a lens carrier 4 which is movable in direction transverse to the optical axis of the camera — i.e., in the plane of the drawing — through a distance corresponding to the spacing between the optical axis O of lens 5 and the optical axis O' of lens 6. Since FIGS. 1 and 2 show lens 5 in operating position, its optical axis O coincides with the optical axis of the camera.

In addition, the carrier 4 is also movable longitudinally of the optical axis of the camera, i.e., inwardly and outwardly with respect to the housing 1; this movement can take place through a distance which is at least equal to the extent to which the telephoto lens 6 must be moved outwardly of housing 1, i.e., extended, for close-up shots.

The movements of these components are controlled by an operating member 7 which is mounted on housing 1 to be turnable together with a scale or dial 7a relative to a fixed marker 7b on the housing. A control cam 8 is fixedly connected to the member 7 so as to turn with the same. A follower arm 9 is mounted on a stationary pin 10 to be turnable about the same. The arm has an end portion which is in tracking engagement with the cam 8; its other end portion is pivoted to a transmission member 11 which is secured to carrier 4 so as to be turnable about an axis 12.

The camera shutter 14 is shown only diagrammatically since its construction forms no part of the invention and is known per se. It is located in the region intermediate the front lens component of the normal lens 5 and the rear lens component of the telephoto lens 6 and it goes without saying that the components of the shutter 14 and its operating elements must not interfere with the movement of carrier 4 transverse to and lengthwise of the optical axis of the camera.

The operation:

To set the distance a user turns the member 7 until the appropriate symbol on dial 7a is located opposite the marker 7b. This results in corresponding turning of the cam 8 which effects turning of arm 9 about axis 10 and displacement of the transmission member 11 through distance a to the position shown in FIG. 2. The movement of member 11 is a composite movement, which is to say that part of the turning movement of arm 9 is converted into a rotary motion of member 11 whereas another part of the turning movement of arm 9 is converted into a sliding motion of member 11 in direction of the optical axis of the camera. Only the latter motion is relevant for displacement of the carrier 4 by the amount n, i.e., the distance which is required to set the normal lens 5 to the position in FIG. 2 for photographing a subject spaced from the camera by a distance of, say 1 m.

Figure 3:
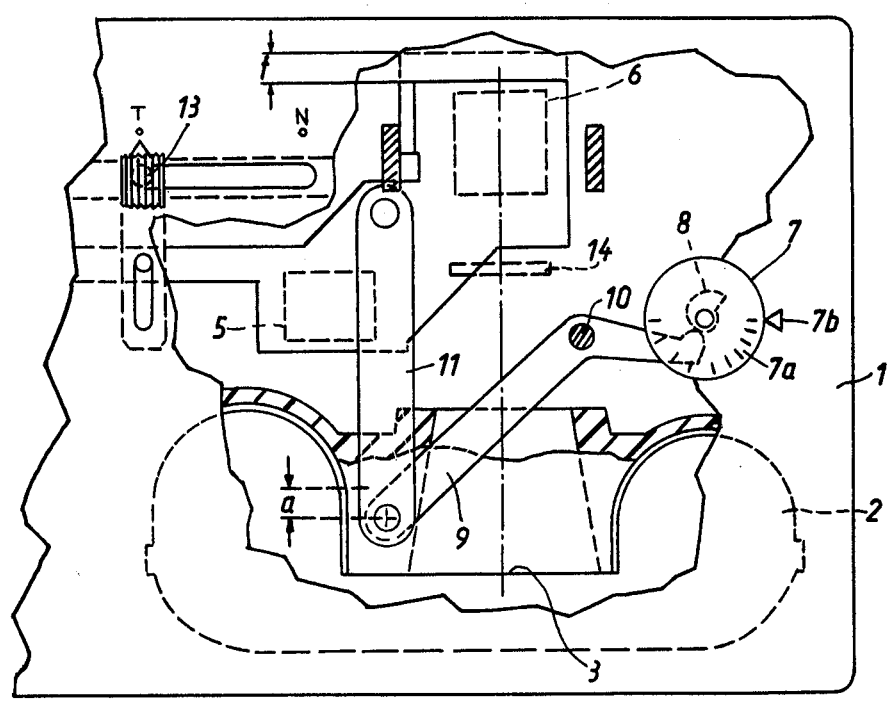
FIG. 3 is a view similar to that of FIG. 1, but showing the telephoto lens in operating position.

If the user desires to change lenses, e.g., to switch from the normal lens 5 in use in FIG. 2 to the telephoto lens 6 which is shown in use in FIG. 3, he moves a handle 13 which is accessible at the outside of housing 1 from setting N (normal) to setting T (telephoto). This moves the carrier 4 to the position shown in FIG. 3 in which it is now the telephoto lens 6 which is located opposite the film window 3. At this time member 11 extends parallel to the optical axis of the camera, rather than being inclined thereto as before; this means that the previously mentioned displacement a is now fully converted into a displacement t of the carrier 4. It should be noted that the displacement t is greater than the displacement n, being selected to afford the focal length increase which is required for the telephoto lens 6 in all distance settings of the same, i.e., for close-up shots, far shots and intermediate shots. Since shutter 14 is stationarily mounted in housing 1, it is unaffected by any displacement of carrier 4.

From the description above it will be clear that only a single distance-setting member 7 is required. It sets the longest focal length as the measure a and transmits it via carrier 4 to whatever lens is in operating position; if a shorter focal length is to be set, the measure a is transmitted to carrier 4 appropriately reduced. A changeover from one lens to the other results automatically in a corresponding change in the position of carrier 4 lengthwise of the optical axis of the camera and thus does not require resetting of the member 7. In other words: once the distance has been set for either one of lenses 5, 6 a switch to the other lens will automatically result in appropriate compensation and adjustment of the focal length of the newly-selected lens.

It is clear that the invention disclosed herein is susceptible of various modifications. For example, three or more different lenses could be mounted on the carrier 4, having focal lengths which differ in accordance with the respective angle of inclination of the member 11 relative to the optical axis of the camera, and hence of the lens which at any given time is in operating position. In such a case the lens having the greatest focal length would be associated with the position of member 11 in which the latter extends substantially parallel to the optical axis.

It will be understood that each of the elements described above, or two or more together, may also find a useful application in other types of applications differing from the types described above.

While the invention has been illustrated and described as embodied in a pocket camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera having an optical axis, a combination comprising at least two different photographic lenses; a lens carrier mounting said lenses; means mounting said lens carrier for displacement in a direction normal to said axis between respective lens-changing first settings in each of which a different one of said lenses is located on said optical axis, and also for displacement in a direction lengthwise of said axis to different second settings corresponding to different distance ranges; means for selecting respective ones of said second settings; and means responsive to operation of said selecting means for displacing said lens carrier lengthwise of said optical axis through distances which differ for each of said second settings in dependence upon the respective first setting assumed by said lens carrier, including a cam movable by said selecting means, a cam follower tracking said cam, and a transmission element transmitting motion from said cam follower to said lens carrier.

2. A combination as defined in claim 1, wherein said selecting means comprises a scale and a member movable relative to said scale.

3. A combination as defined in claim 1, said cam follower being turnably mounted and having one end portion in tracking engagement with said cam and another end portion turnably connected to said transmission element.

4. A combination as defined in claim 3, wherein said transmission element has a first end portion to which said another end portion of said cam follower is turnably connected, and a second end portion which is turnably connected to said lens carrier.

5. A combination as defined in claim 1; and further comprising means for effecting said displacement of said lens carrier in said direction normal to the optical axis.

6. A combination as defined in claim 5, wherein the last-mentioned means comprises a manually engageable portion.

* * * * *